United States Patent [19]

Furness et al.

[11] 4,378,703

[45] Apr. 5, 1983

[54] FLOWMETER

[75] Inventors: Richard A. Furness, South Benfleet; Robert A. Lauder, Romford, both of England

[73] Assignee: The British Steam Specialties Limited, Lee Circle, England

[21] Appl. No.: 223,040

[22] Filed: Jan. 7, 1981

[30] Foreign Application Priority Data

Jan. 11, 1980 [GB] United Kingdom ............... 8000963
Jan. 11, 1980 [GB] United Kingdom ............... 8001041

[51] Int. Cl.$^3$ ............................................. G01F 1/12
[52] U.S. Cl. .......................... 73/861.79; 73/861.92; 73/861.83
[58] Field of Search ........... 73/861.79, 861.91, 861.92, 73/861.81, 861.83, 861.86

[56] References Cited

U.S. PATENT DOCUMENTS 3,709,037 1/1973 Abbotts ........................... 73/861.92
3,815,415 6/1974 Wemyss et al. ................. 73/861.79

Primary Examiner—Charles A. Ruehl
Attorney, Agent, or Firm—Blodgett & Blodgett

[57] ABSTRACT

In a flow meter of the type comprising a rotor consisting of a spindle 12 and bearing heads 9 and 11 cooperating with seats 5 and 6 to give support of the rotor, it has been found that the flow does not split evenly between the ends. In order to improve the flow performance, the flow characteristics of the two heads 9 and 11 are chosen to be different so as to have their transitions from laminar to turbulent flow occuring sequentially. It is preferred that the turbine means on the rotor be formed by angled passages through the bearing heads 9 and 11.

4 Claims, 8 Drawing Figures

FLOWMETER

This invention relates to flow meters of the type comprising a body including a rotor having turbine means actuated by the fluid flow to be measured, the rotational speed of the rotor being related to the rate of flow. The rotational speed is frequently measured by continuously counting the revolutions of the rotor, e.g. by electromagnetic means.

One particular form of flow meter of this type is described in United Kingdom Patent specification No. 1,398,274. In that specification there is described a type of meter having a double-ended rotor having a spindle carrying two sets of turbine blades and two bearing heads each downstream of the corresponding turbine blades. The flow is split so as to be partly over each of the sets of blades and thence past the bearing heads which cooperate with corresponding seats to act as combined radial and thrust fluidic bearings to support the rotor for rotation.

At the no-flow condition the rotor rests on and virtually seals the top bearing seat, and a pressure drop past the lower head and blades is required to balance the mass of the rotor assembly before lift-off occurs.

It follows that below a minimum flow rate there is no movement of the rotor and therefore no flow rate is recorded. There then follows a range of flow rate over which the meter factor (expressed in terms of pulses per unit volume) increases rapidly. The meter factor actually peaks before falling into a fairly flat zone which is the range over which the rotational speed is effectively proportional to the flow rate.

It is believed that the peak is due partly to the transition from laminar to turbulent flow.

It has now been discovered that the splitting of the flow between the two ends of the rotor is not even and varies with flow rate. It has also been found that by appropriate choice of the flow characteristics of the two ends of the rotor, it is possible to stagger their transitions from laminar to turbulent flow. The effect of this can be that the falling from the peak on one rotor end coincides with the rise to the peak in the other end, so that these two effects may substantially cancel each other out. The result of this is to shift the onset of the effective or substantially linear range of operation of the meter to a lower flow rate.

Accordingly, the present invention consists in a flow meter of the type comprising a body including a double ended rotor provided with two opposed bearing heads cooperable with bearing seats in the body to act as combined radial and thrust fluidic bearings, and turbine means associated with each head to rotate the rotor in response to fluid flow, in which the geometries of the rotors and associated turbine means differ and are chosen so that the transitions from laminar to turbulent flow occurs at different flow rates and the decline in the characteristic curve due to the first transition coincides with a rise due to laminar flow prior to the second transition.

This invention may be applied to rotors of the type having turbine blades, e.g. as in the above-mentioned specification No. 1,398,274. However, it is particularly useful if the invention is applied to a bladeless type of rotor in which the turbine means is formed by angled passages through the bearing heads of the rotor. In such an arrangement it is comparatively simple to provide differing arrangements of passages drilled through the bearing heads.

The present invention further consists in a fluid flowmeter comprising a body having an inlet passage leading to a stator passage which splits the flow from the inlet passage, a double-ended rotor in the stator passage and having a pair of bearing heads cooperable with bearing seats to form combined radial and thrust bearings supporting the rotor in the fluid flowing through the stator passage, in which turbine means for rotating the rotor are formed by angled passages through the bearing heads.

The advantages of this design are several. Firstly, lift-off should occur earlier since at low flows the top flow path i.e. that past the upper bearing seat, is not sealed. Thus, by varying the gap between the bearing head and the wall, the hole geometry becomes critical in determining the lift-off point, since this controls the pressure drop across the bearing head. The mass of the rotor assembly is also reduced by the removal of the two turbine rotors and this together with the first point will give rise to earlier lift-off. Thus, potentially the low flow performance is improved. At high flows with the conventional bladed rotor, blade interaction effects give rise to pressure losses and hence with the avoidance of blades a lower pressure drop through the meter can be expected for the same volume flow. The tip clearance dependance is removed and number of components is reduced, giving rise to lower production costs. There exists therefore the possibility of producing a superior meter more quickly and cheaply than the conventional design.

The invention will be further described with reference to the accompanying drawings, in which.

Figure 1:
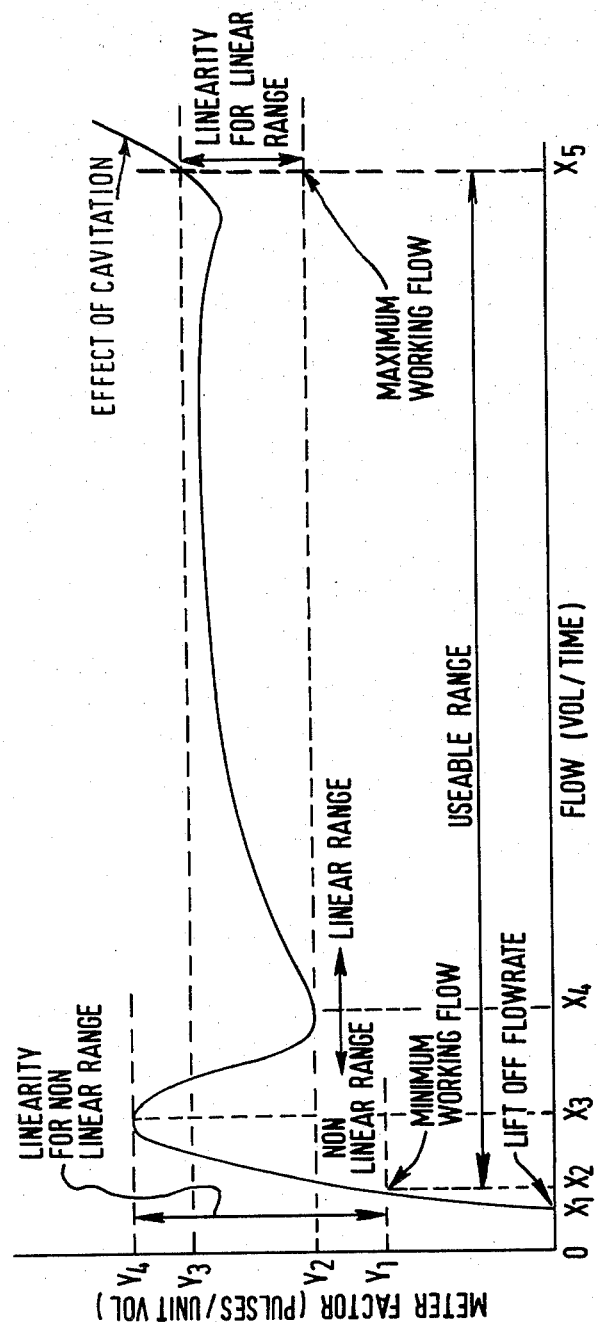
FIG. 1 is a typical characteristic curve of a meter of the type to which the present invention relates.

FIG. 1 shows a typical characteristic curve for a meter of the type to which the invention relates. The curve shown in full lines in the characteristic of the meter and is a plot of the meter factor, i.e. pulses per unit volume, against the flow rate through the meter. It will be seen that the meter factor is reasonably constant, giving a usable result from the meter in the range between flow values $X_4$ and $X_5$ and the range of values of the meter factor between the dotted line $Y_2$ and $Y_3$ is known as the linearity band. For flow rates below $X_4$, the meter factor rises very rapidly from a zero reading at a positive flow rate $X_1$ when the driving torque first overcomes the drag. From a rate $X_2$, with a meter factor $Y_3$ to a value $X_3$, where the meter factor exhibits a peak $Y_4$ there is a usable non-linear range, and from the peak at $Y_4$, the meter factor declines into the linear range. Above the flow value $X_5$ there is an onset of cavitation as indicated by the step rise in the characteristic and the meter become inaccurate.

Figure 2:
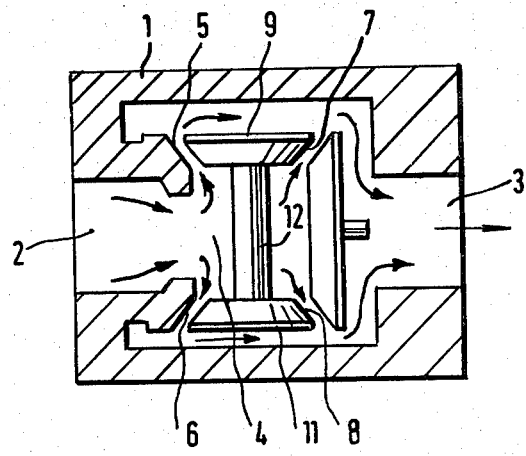
FIG. 2 is a sectional view showing a form of meter according to the present invention.

FIG. 2 shows a flow meter including a body 1 having an inlet duct 2 and an outlet duct 3. The inlet duct 2 feeds into a stator passage 4 in which the flow is split so that part of the flow goes towards an upper bearing seat 5 and parts towards a lower bearing seat 6. The two flows then recombine in the outlet duct 3. Bearing seats 5 and 6 are frusto-conical in form and co-operate with frusto-conical surfaces 7 and 8 respectively on upper and lower bearing heads 9 and 11. The bearing heads 9 and 11 are joined by a spindle 12 and, together with that spindle, constitute a flow measuring rotor. The rotor carries an insert (not shown) which actuates an electromagnetic sensing device which operates to emit a fixed number of pulses per revolution and the counting of the pulses constitutes a measure of the flow through the meter.

Figure 8:
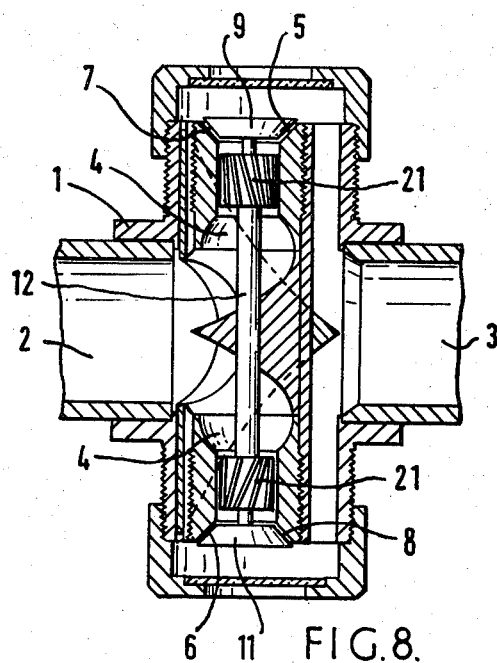
FIG. 8 is a sectional view of a conventional type of meter to which the present invention may be applied.

In the conventional meter as previously described, for instance in United Kingdom Patent Specification 1,398,274, and as shown in FIG. 8, the rotor carries turbine blades 21 or vanes which cause it to rotate in response to the flow of liquid along the stator passage 4. In the arrangement illustrated in that patent specification, the blade or vane arrangements are the same at the upper and lower ends of the rotor. It will be appreciated that the characteristics of the rotor may be varied by alteration in the parameters of the blades or vanes. In applying the present invention to the type of construction shown in that patent specification, the parameters of the blades or vane arrangements would differ as between the upper and lower ends of the rotor to achieve the desired charateristic.

Figure 3:
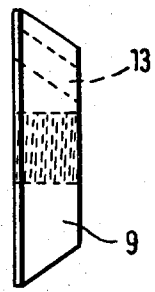
FIG. 3 is a side elevation of a typical form of upper bearing head.
Figure 4:
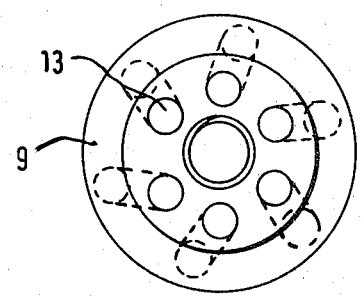
FIG. 4 is a plan view of the head of FIG. 2.

As illustrated in FIGS. 2 to 6 the bearing heads 9 and 11 are provided with angled passages 13 (see FIGS. 3 and 4) which act as turbine means to cause the rotor to be rotated by the flow of liquid through the passage 13. FIG. 3 shows the position of just one passage in the bearing head 9, the remainder being omitted for clarity of illustration, whereas FIG. 4 shows the bearing head 9 with six equispaced drilled holes. Obviously, the number, size, spacing and orientation of the holes are chosen in accordance with the required characteristics of the rotor.

The rotor is suspended in the flowing fluid so that the bearing heads co-operate with the bearing seats to form combined thrust and radial bearings which gives a virtually frictionless rotation of the rotor.

Figure 5:
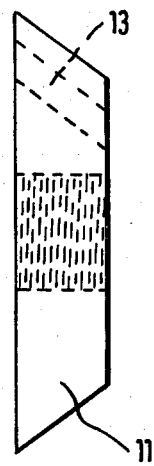
FIGS. 5 and 6 shows a typical form of lower bearing head.
Figure 6:
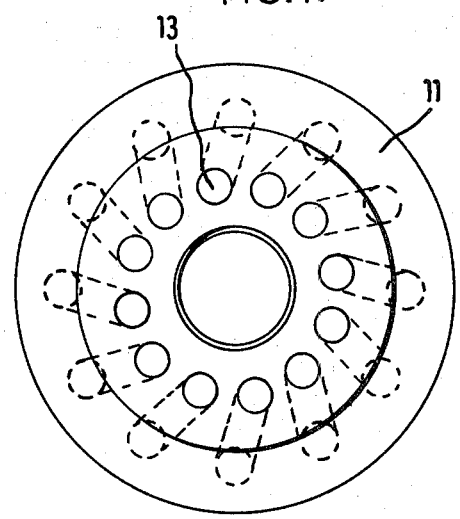

In order to achieve a suitable form for the characteristic curve of the meter as a whole, the geometries of the passages 13 in the upper and lower bearing heads 9 and 11 will normally differ, and FIGS. 5 and 6 show a bearing head 11 which has twelve passages 13.

This choice of differing geometry enables a wider range of operation to be obtained. In particular, it is envisaged that the geometry of one bearing head will be chosen and then that of the other calculated to iron out the hump (or peak) in the characteristic curve by achieving the sequential rather than simultaneous transition from laminar to turbulent flow. Thus the effect of viscous fluids on turbine type devices can be estimated and corrected for by varying the size, number and orientation of the flow passages. A theoretical analysis has shown the geometry of the holes greatly affects the performance in laminar flow since the Reynolds number of the flow through each hole is the critical parameter. This analysis indicates that for laminar flow, for a given flow rate, the number of holes varies inversely as the fourth power of the radius for hydrodynamic scaling and in turbulent flow the number of holes varies inversely as the hole radius to the power 2.715.

Figure 7:
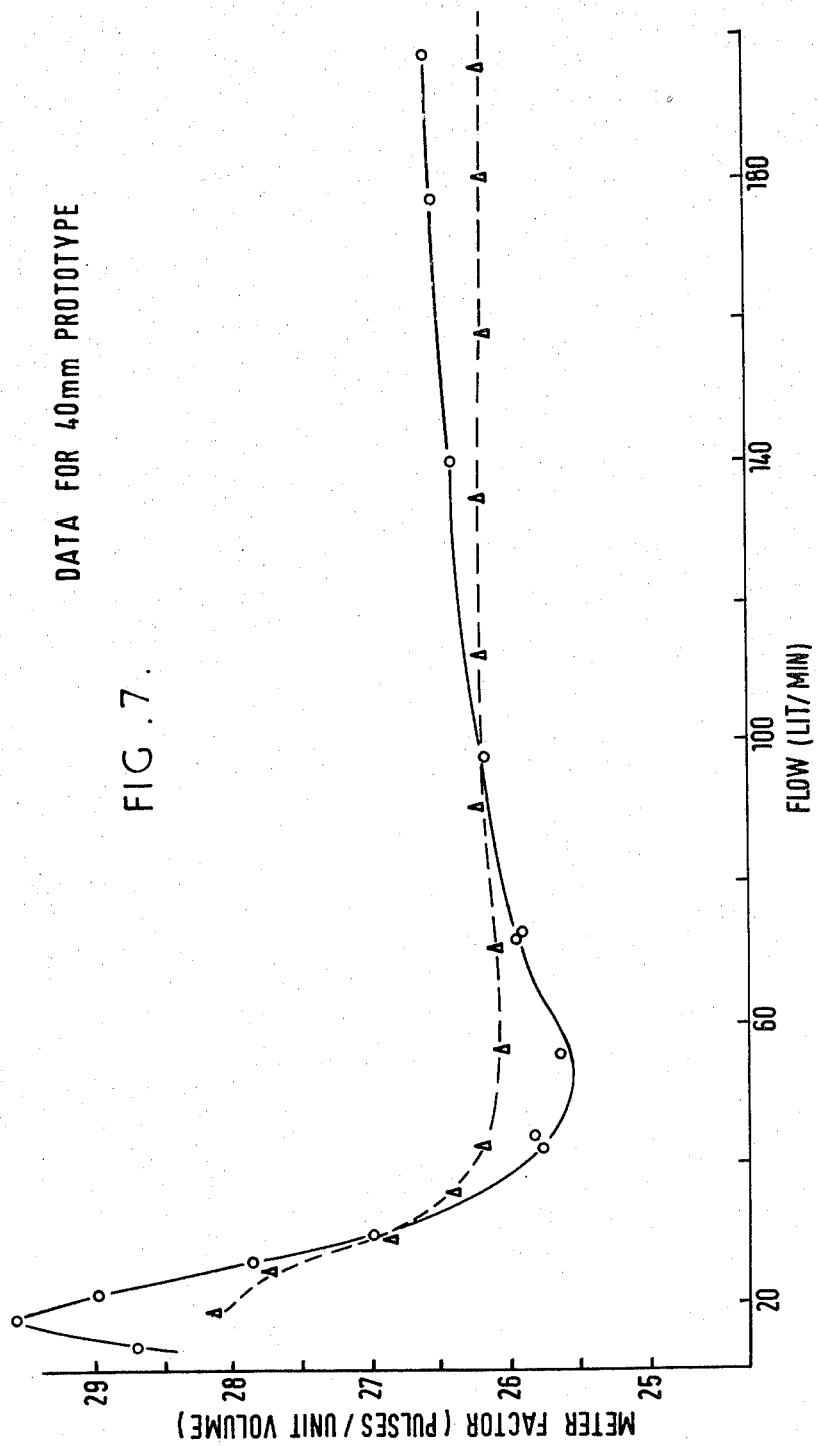
FIG. 7 shows a comparison between the characteristic curves of a prior art meter and a form of meter in accordance with the invention.

FIG. 7 shows a comparison between an actual characteristic curve, shown in full lines, of a commercial flow meter based on that described in United Kingdom Patent Specification No. 1,398,274, and that of a comparable 40 mm prototype meter made in accordance with the present invention. The characteristic curve of the prototype meter is shown in dashed lines. It will be seen that not only is the onset of the linearity achieved at a lower flow rate, e.g. 40 liters/minute instead of 70 liters/minute but also the actual linearity as represented by the constancy of the value of the meter factor is improved.

Various modifications may be made within the scope of the invention.

We claim:

1. In a flow meter of the type comprising a body including a double ended rotor provided with two spaced bearing heads cooperable with bearing seats in the body to act as combined radial and thrust fluidic bearings, and turbine means associated with each head to rotate the rotor in response to fluid flow; the improvement that the geometries of the bearing heads and associated turbine means differ and are chosen so that the transitions from laminar to turbulent flow occur at different flow rates and the decline in the characteristic curve due to the first transition coincides with a rise due to laminar flow prior to the second transition.

2. A flow meter as claimed in claim 1, in which each turbine means on the rotor is formed by turbine blades.

3. A flow meter as claimed in claim 1, in which each turbine means on the rotor is formed by angled passages through the bearing heads of the rotor.

4. A flow meter of the type comprising a body having an inlet passage leading to a stator passage which splits the flow from the inlet passage, a double-ended rotor in the stator passage, the rotor having a pair of bearing heads cooperable with bearing seats in the body to form combined radial and thrust bearings supporting the rotor in the fluid flowing through the stator passage, the rotor having turbine means whereby it is rotated by fluid flow, said flow meter characterized by the fact that:

the turbine means for rotating the rotor are formed by angled passages through the bearing heads, each of said angled passages having an inlet end and an outlet end spaced from the periphery of its respective bearing head.

* * * * *